(12) United States Patent
Taravat et al.

(10) Patent No.: US 7,734,441 B2
(45) Date of Patent: Jun. 8, 2010

(54) METHOD AND DEVICE FOR MEASURING AND CONTROLLING THE AMOUNT OF FLOW/VOLUME OF LIQUID PUMPED/TRANSFERRED BY AN ELECTRO-PUMP

(76) Inventors: Mohsen Taravat, #23, 6th Flr, Bulg #422, Beheshti St, West of Ghemagham Junction, Tehran, TE (IR); Amin Moazedi, #23, 6th Flr, Bulg #422, Beheshti St, West of Ghemagham Junction, Tehran,TE (IR); Hossein Nazarboland Jahromi, #23, 6th Flr, Bulg #422, Beheshti St, West of Ghemagham Junction, Tehran, TE (IR)

( * ) Notice: Subject to any disclaimer, the term of this patent is extended or adjusted under 35 U.S.C. 154(b) by 44 days.

(21) Appl. No.: 12/241,085

(22) Filed: Sep. 30, 2008

(65) Prior Publication Data

US 2009/0099700 A1    Apr. 16, 2009

(51) Int. Cl.
*G05D 7/06* (2006.01)
*G01R 21/06* (2006.01)
*G06F 1/28* (2006.01)

(52) U.S. Cl. .......................... 702/100; 702/33; 702/44; 702/45; 702/47; 702/50; 702/55; 702/57; 702/60; 702/61; 702/85; 702/86; 702/105; 700/281; 700/282; 700/291; 700/295; 700/297; 705/413

(58) Field of Classification Search ............ 702/33, 702/44, 45, 47, 50, 55, 57, 60–61, 85–86, 702/100, 105; 700/281, 282, 291, 295, 297; 705/413
See application file for complete search history.

(56) References Cited

U.S. PATENT DOCUMENTS

| 6,963,187 B2* | 11/2005 | Bebic et al. | 323/207 |
| 2003/0065471 A1* | 4/2003 | Tsuji et al. | 702/130 |
| 2006/0089752 A1* | 4/2006 | Voigt | 700/282 |

* cited by examiner

*Primary Examiner*—Sujoy K Kundu
(74) *Attorney, Agent, or Firm*—Barry Choobin; Chobin & Chobin Consultancy LLC (57) ABSTRACT

Disclosed is a method and system for measuring and controlling an amount of flow and volume of liquid fluid and/or electrical energy consumed by an electro-pump. The method and system obtains a plurality of values for electrical parameters of the electro-pump including voltage value, currents value and active/reactive energy value; calculates the plurality values; and determines and controls the amount of instant flow and volume of said liquid fluid based on said calculated values. The system/method gathers these two measuring and controlling features (i.e. measuring and controlling the volume of liquid and amount of energy) in one casing, thereby, where applicable, provides a secure reference for policy making of both two parameters at the same time (e.g. for underground water resources).

10 Claims, 7 Drawing Sheets

METHOD AND DEVICE FOR MEASURING AND CONTROLLING THE AMOUNT OF FLOW/VOLUME OF LIQUID PUMPED/TRANSFERRED BY AN ELECTRO-PUMP

FIELD OF THE INVENTION

The present invention relates to measuring and controlling the amount of flow/volume of liquid pumped/transferred by an electro-pump. In particular relates to measuring and controlling the underground water resources.

BACKGROUND OF THE INVENTION

The scarcity of water wells, in addition to the restricted harsh operational conditions that water wells impose to their measuring equipments causes s a real paradox. On one hand, it is needed a complicated industrial, robust, and resistant to hard working conditions, and also anti-tampering measuring/controlling device, and on the other hand it is needed a simple maintenance-free, and inexpensive solution. The present invention has solved the above paradox.

The meter developed based on the present invention, is simple to install, operate, and maintain, and at the same time is robust, accurate and more economic. Furthermore, in order to determine the amount of flow/volume of liquid that pumped/transferred by an electro-pump, unlike the conventional water meters, such as Displacement water meters, Velocity water meters, Electromagnetic meters and ultrasonic meters, the present invention relies on electrical parameters of the energy consumed by mentioned electro pump. The meter developed based on the present invention, overcomes the disadvantages and problems of conventional water meters used for measuring and monitoring the water pumped out of underground water resources, especially, using a built in controlling/managing system, the problem of preventing from illegal water/energy consumption.

The embodiment of the present invention gathers the features of measuring and controlling the volume of liquid, and the amount of energy in one casing, thereby, where applicable, provides a secure reference for policy making of both two parameters at the same time (e.g. for underground water resources).

SUMMARY OF THE INVENTION

It is an object of the present invention to provide a different and more advantageous approach for the elimination of the aforementioned disadvantage.

In order to achieve this object, the invention therefore consists of a method and system for measuring and controlling amounts of liquid and/or electrical energy consumption consumed by an electro pump, wherein said amount of liquid consumption comprises of flow and/or volume of said liquid that is pumped/transferred by said electro pump. The method and system obtains a plurality of values for electrical parameters of the electro-pump including voltage value, currents value and active/reactive energy value; calculates the plurality values; and determines and controls the amount of instant flow and volume of said liquid fluid based on said calculated values. The system/method gathers these two measuring and controlling features (i.e. measuring and controlling the volume of liquid and amount of energy) in one casing, thereby, where applicable, provides a secure reference for policy making of both two parameters at the same time (e.g. for underground water resources).

In accordance with a preferred embodiment of the invention and/or its preferred development the method comprises: Continuously measuring the currents and voltages of said electro-pump; Continuously calculating, and updating active and reactive energies, instant electrical power, instant power factor and the frequency of said voltages; Continuously calculating, and updating the amount of said liquid consumption wherein said Calculating and updating comprises of steps: Taking a flow-power curve of said electro-pump as a first input data; Taking an operational condition of the electro-pump as second input data wherein said second input data comprises of instant flow and instant consumed electrical power; Calibrating the Flow-Power curve according to said operational condition and obtaining a calibrated flow power curve; obtaining the amount of flow from the calibrated flow power curve of said electro pump by locating the instant power on said calibrated flow power curve; Continuously calculating the volume of pumped/transferred liquid by taking time integral of the amount of flow; Continuously monitoring, updating, displaying and/or recording the amount of said measured currents and voltages of said electro-pump; Continuously monitoring, updating, displaying and/or recording the amount of said calculated active and reactive energies, instant electrical power, instant power factor and the frequency of said voltages; Continuously monitoring, updating displaying and/or recording the amount of said energy consumption consumed by said electro pump as an updated amount of electrical energy consumption; and Continuously monitoring, updating displaying and/or recording the amount of said liquid consumption as an updated amount of liquid consumption.

In accordance with another aspect of the present invention the method further comprises: Controlling the amount of said liquid and/or electrical energy consumption wherein said method further comprises; Designating a predetermined allowable amount of liquid and or electrical energy consumption to a smart card which is identified with an electro pump; Communicating with said smartcard for a bilateral data transmission via a smart card reader; Checking, determining and confirming, validity of said smartcard; Reading the maximum predetermined allowable amount of liquid consumption from said smart card being characterized as liquid credit; Reading the maximum predetermined allowable amount of electrical energy consumption from said smart card being characterized as energy credit; Continuously updating the liquid credit by subtracting the updated liquid consumption form said liquid credit and obtaining an updated allowable amount of liquid consumption; Continuously updating the energy credit by subtracting the updated energy consumption form said energy credit and obtaining an updated allowable amount of electrical energy consumption.

In accordance with another aspect of the present invention the method further comprises: recording said amount of updated liquid and/or electrical energy consumption, wherein said amount of updated liquid and/or electrical energy consumption exceeds said maximum allowable liquid and/or electrical energy consumption, and obtaining and recording an exceeded amount of maximum allowable liquid and/or electrical energy consumption.

In accordance with another aspect of the present invention the method further comprises: sending an optional interruption signal to disable said elector pump when said amount of updated liquid and/or electrical energy consumption exceeds said maximum allowable liquid and/or electrical energy consumption.

In accordance with another aspect of the present invention the method further comprises: storing Calculated, and updated active and reactive energies, said amount of updated of said liquid consumption, said updated liquid credit, said updated electrical energy credit and said exceeded amount of maximum allowable liquid and/or electrical energy consumption on a smart card.

Yet in accordance with another aspect of the present invention, the present invention discloses a system for measuring and controlling amount of liquid and/or electrical energy consumption consumed by an electro pump, wherein said amount of liquid consumption comprises of flow and/or volume of said liquid that is pumped/transferred by said electro pump, wherein said system comprises: Means for continuously measuring the currents and voltages of said electropump; Means for continuously calculating, and updating active and reactive energies, instant electrical power, instant power factor and the frequency of said voltages; Means for continuously calculating, and updating the amount of said liquid consumption wherein said Calculating and updating comprises of steps: Means for taking a flow-power curve of said electro-pump as a first input data; Means for taking an operational condition of the electro-pump as second input data wherein said second input data comprises of instant flow and instant consumed electrical power; Means for calibrating the Flow-Power curve according to said operational condition and obtaining a calibrated flow power curve; Means for obtaining the amount of flow from the calibrated flow power curve of said electro pump by locating the instant power on said calibrated flow power curve; Means for continuously calculating the volume of pumped/transferred liquid by taking time integral of the amount of flow; Means for continuously monitoring, updating, displaying and/or recording the amount of said measured currents and voltages of said electro-pump; Means for Continuously monitoring, updating, displaying and/or recording the amount of said calculated active and reactive energies, instant electrical power, instant power factor and the frequency of said voltages; Means for Continuously monitoring, updating displaying and/or recording the amount of said energy consumption consumed by said electro pump as an updated amount of electrical energy consumption; and Means for Continuously monitoring, updating displaying and/or recording the amount of said liquid consumption as an updated amount of liquid consumption.

Yet in accordance with another aspect of the present invention, the present invention comprises means for Controlling the amount of said liquid and/or electrical energy consumption wherein said method further comprises; means for Designating a predetermined allowable amount of liquid and or electrical energy consumption to a smart card which is identified with an electro pump; means for Communicating with said smartcard for a bilateral data transmission via a smart card reader; means for checking, determining and confirming, validity of said smartcard; means for Reading the maximum predetermined allowable amount of liquid consumption from said smart card being characterized as liquid credit; means for Reading the maximum predetermined allowable amount of electrical energy consumption from said smart card being characterized as energy credit; means for Continuously updating the liquid credit by subtracting the updated liquid consumption form said liquid credit and obtaining an updated allowable amount of liquid consumption; and means for Continuously updating the energy credit by subtracting the updated energy consumption form said energy credit and obtaining an updated allowable amount of electrical energy consumption.

Yet in accordance with another aspect of the present invention, the present invention discloses a system comprising: means for Recording said amount of updated liquid and/or electrical energy consumption, wherein said amount of updated liquid and/or electrical energy consumption exceeds said maximum allowable liquid and/or electrical energy consumption, and Means for obtaining and recording an exceeded amount of maximum allowable liquid and/or electrical energy consumption.

In accordance with another aspect of the present invention, the present invention discloses a system comprising: Means for sending an optional interruption signal to disable said elector pump when said amount of updated liquid and/or electrical energy consumption exceeds said maximum allowable liquid and/or electrical energy consumption.

In accordance with another aspect of the present invention, the present invention discloses a system comprising: Means for storing said Calculated, and updated active and reactive energies, said amount of updated of said liquid consumption, said updated liquid credit, said updated electrical energy credit and said exceeded amount of maximum allowable liquid and/or electrical energy consumption on said smart card.

BRIEF DESCRIPTION OF THE DRAWING

For a more complete understanding of the present invention and for further advantages thereof, reference is now made to the following Detailed Description, taken in conjunction with the following drawing.

DETAILED DESCRIPTION OF THE INVENTION

Figure 1:
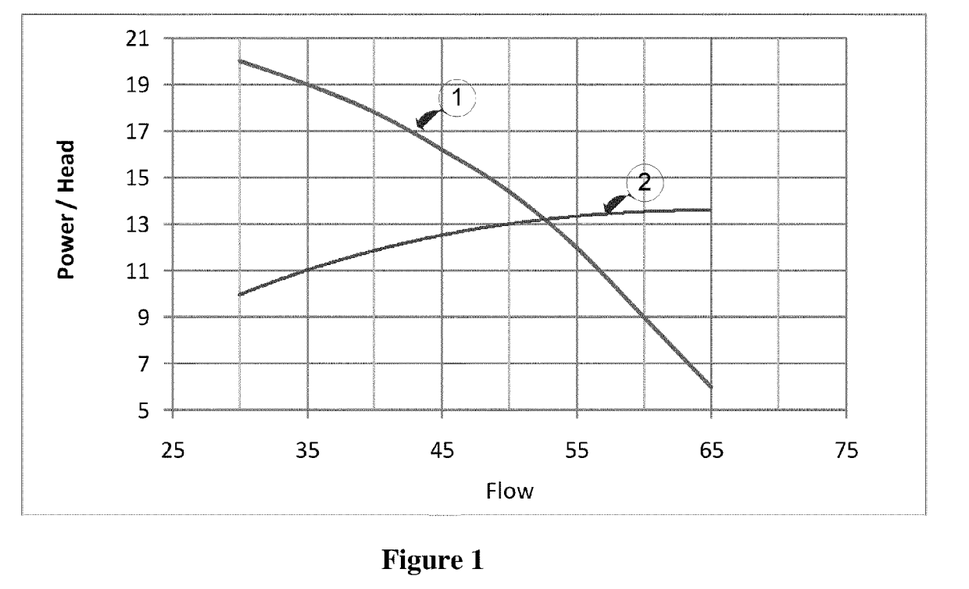
FIG. 1 is an illustration of the Head-Flow and Power-Flow curves of a typical pump

The Head-Flow curve of a typical pump is depicted in FIG. 1. The curve, (1), illustrates how the flow vary when the head changes. The head variation is not necessarily due to the pumping level, but could be a result of any kind of throttling or any other phenomenon which can be modeled as the Head-variation.

Figure 2:
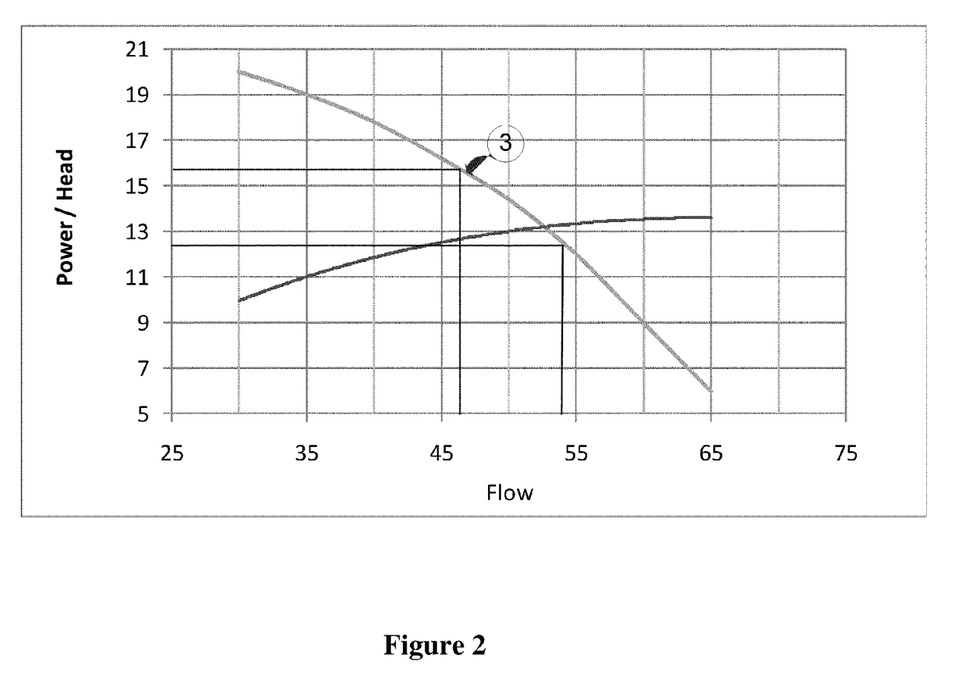
FIG. 2 is another illustration of the Head-Flow and Power-Flow curves of a typical pump

In each specific pump the mechanical absorbed power is a function of both Flow and Head. As could be seen in FIG. 1, for each specific pair of Flow and Head, in a particular pump, there is just one absorbed power related. FIG. 2 illustrates above explanation more clearly. For instance, when a valve throttles the discharge path of the pump, the imposed Head to the pump will increase, and consequently the Flow and the absorbed Power will decrease reciprocally. It means that, when the absorbed power, in each specific pump, is determined, the pump curves will introduce the related Flow and the related Head accordingly.

In each specific electro-pump, convolving, the Efficiency curve of its electromotor with the Power-Flow curve of its pump, a unique relation between the electrical absorbed power and the Flow will be achieved; wherein the Efficiency curve of the electromotor is a relation between the mechanical output power and the electrical absorbed power of the electromotor.

Figure 3:
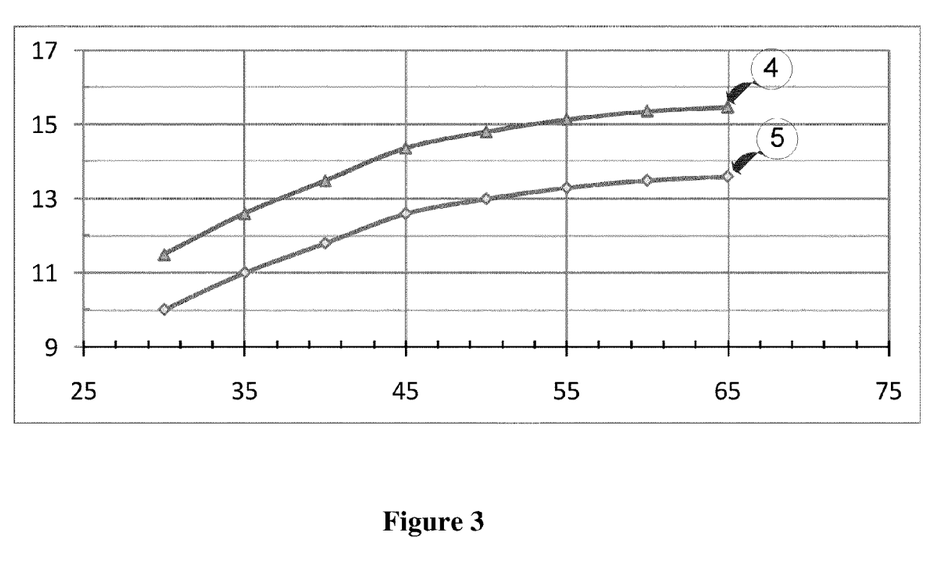
FIG. 3 is an illustration of a default Flow-Power curve of a typical pump and a modified Flow-Power curve of that pump which was amended according to the embodiment of the present invention.

In FIG. 3, (4) shows the Flow-Power-Curve of a pump according to the pump manufacturer datasheets, and (5) represents an updated curve according to the Efficiency curve of the electromotor and assessment of operational condition of the electro pump. In actual (operational) condition the Flow-Power curve of an electro-pump may slightly deviate from the curve issued by the manufacturer as design curve. Hence, in order to achieve more accurate measurement, the curves issued by the manufacturer should be corrected according to the operational condition. In this article, this correction procedure is called "Calibration" from now on. Therefore this curve (5) is not only a combination of the first curve (4) and Efficiency-Curve of the electromotor, but also incorporates the probable necessary Calibration. As a result, said curve (5) identifies the relation between the Flow and the electrical absorbed power of the electro-pump.

Therefore, knowing the instant electrical power consumed by said electro-pump, the said flow-power curve, enables us to determine the related flow. In other words by locating the instant power on the Flow-Power curve, the instant flow will be easily achieved.

Volume is the time integral of Flow. So, in the present invention, by integrating the instant flow over a specific period of time, the volume of liquid that was pumped/transferred during said period will be derived. The embodiment of the present invention, which its block-diagram shown in FIG. 4, employing a microcontroller based system and using usual digital processing routines, executes and performs all aforementioned measurements and calculations.

Figure 4:
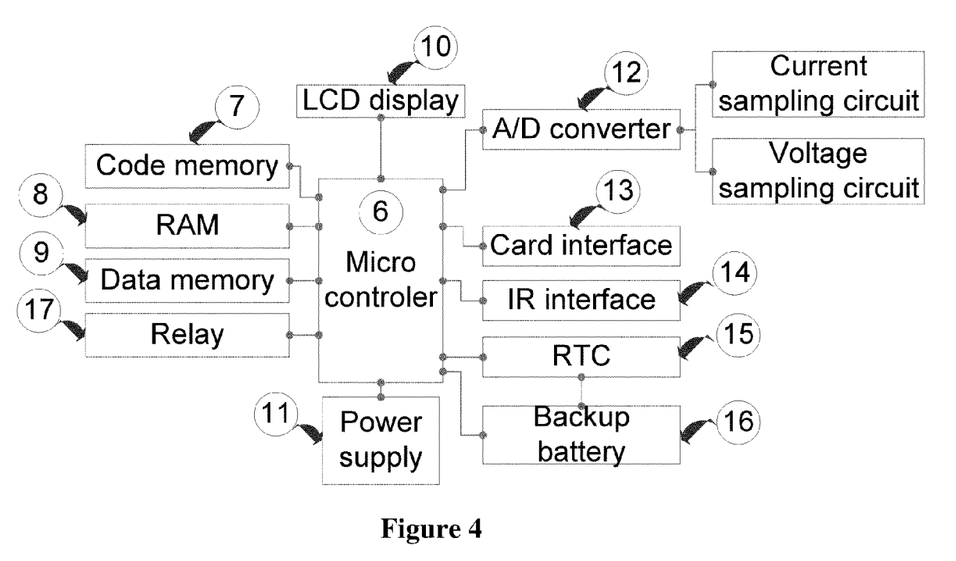
FIG. 4 is a block diagram of the embodiment of the present invention

As shown, FIG. 4 is a basic block-diagram of a meter developed based on the present invention. The physical installation procedure of this meter, on the electrical power circuit of an electro-pump, is same as the procedure of conventional digital energy meters. When the meter presented in FIG. 4, were installed on the electrical power circuit of an electro-pump, it continuously measures the currents and voltages of the electro-pump and calculates the active/reactive energies, instant electrical power, instant power factor and the frequency, exactly as a conventional digital energy meter does. The meter also displays and/or records said measured/calculated electrical parameters.

Besides, using the novel algorithm hitherto illustrated in FIG. 1 to 3, the meter presented in FIG. 4, calculates the amount of flow/volume of liquid pumped/transferred by the said electro-pump, and also displays and/or records the calculated values. Hereafter, for brevity, the amount of flow/volume of liquid pumped/transferred by the said electro-pump is called "liquid consumption"

In addition to mentioned features, the meter presented in FIG. 4 provides a credit controlling facility. The said meter using smartcard system, manages and controls the liquid/energy consumption, wherein said smartcard system can read/write from/to a smartcard. Therefore, the maximum predetermined volume of liquid that is allowed to be pumped/transferred and/or the maximum predetermined amount of electrical energy which is permitted to be consumed, can be recorded on a smartcard and transmitted to said meter. In this article, wherever specified, "Liquid credit" and "energy credit" refers to "the volume of liquid that is allowed to be pumped/transferred", and "the amount of electrical energy which is permitted to be consumed", respectively.

The meter presented in FIG. 4 continuously monitors, updates and records the "liquid consumption" and the consumed energy The meter presented in FIG. 4 continuously updates the remaining "liquid credit" by subtracting the last updated "liquid consumption" forms said maximum predetermined "liquid credit". Also the meter presented in FIG. 4 continuously updates the remaining "energy credit" by subtracting the last updated amount of consumed energy form said maximum predetermined "energy credit". If the last updated "liquid consumption" exceeds said maximum predetermined "liquid credit" or the last updated amount of consumed energy exceeds said maximum predetermined "energy credit", the remaining "liquid credit"/"energy credit" takes a negative value. In this case the values the remaining "liquid credit" and "energy credit", which indicate the amount of illegal consumption of liquid/energy, will be recorded in separate registers.

Furthermore, the meter presented in FIG. 4 includes an auxiliary relay which may be programmed to send an interruption command to the power circuit of said electro-pump, in case of illegal energy/liquid consumption. It should be noted that, there must be a power interrupting device in the power circuit of the electro-pump that receives the said interrupting command, and enforce the power circuit interruption.

In the meter presented in FIG. 4, whenever a valid smartcard inserted, all the information measured/calculated and recorded in the said meter, is transferred to the smartcard for external use.

The meter presented in FIG. 4, includes an Infrared Port based on IEC 62056 standard that obliged almost by all national and regional standards for digital energy meters. This port is used as a Human Machine Interface (HMI) for necessary adjustments, calibration, reading the recorded parameters and so on.

Hereafter, all functions of the blocks shown in FIG. 4 are presented briefly. (6-11) represent a minimum system pivoted on a microcontroller, which incorporates: A LCD (Liquid Crystal Display) for displaying all parameters measured, calculated or recorded in the meter; Volatile and nonvolatile Memories (including RAM, Data memory and Code memory) as a storage space for recording the measured/calculated parameters and also partially, as temporary memories for arithmetic operations; (12) shows Analog to digital converters for voltages and currents respectively and relevant sampling and auxiliary circuits; (13) Smartcard interfacing circuits, which include the whole smartcard system including the relevant connector and other components and connect the meter to the smartcard system, according to ISO 7816 standard; (14), Interfacing circuits for Infrared Port according to IEC 62056 standard; (15), RTC (Real Time Clock) circuit to make a precise reference for the time and date in the meter, which can be an internal circuit (included in the microcontroller) or an external one, (16), one or two backup battery to secure the continuous operation of RTC system and also to make the RWP (Read Without Power) facility available; and (17), an auxiliary relay for interrupting the power circuit and enforcing liquid and/or energy-consumption-ban as mentioned before.

Figure 5:
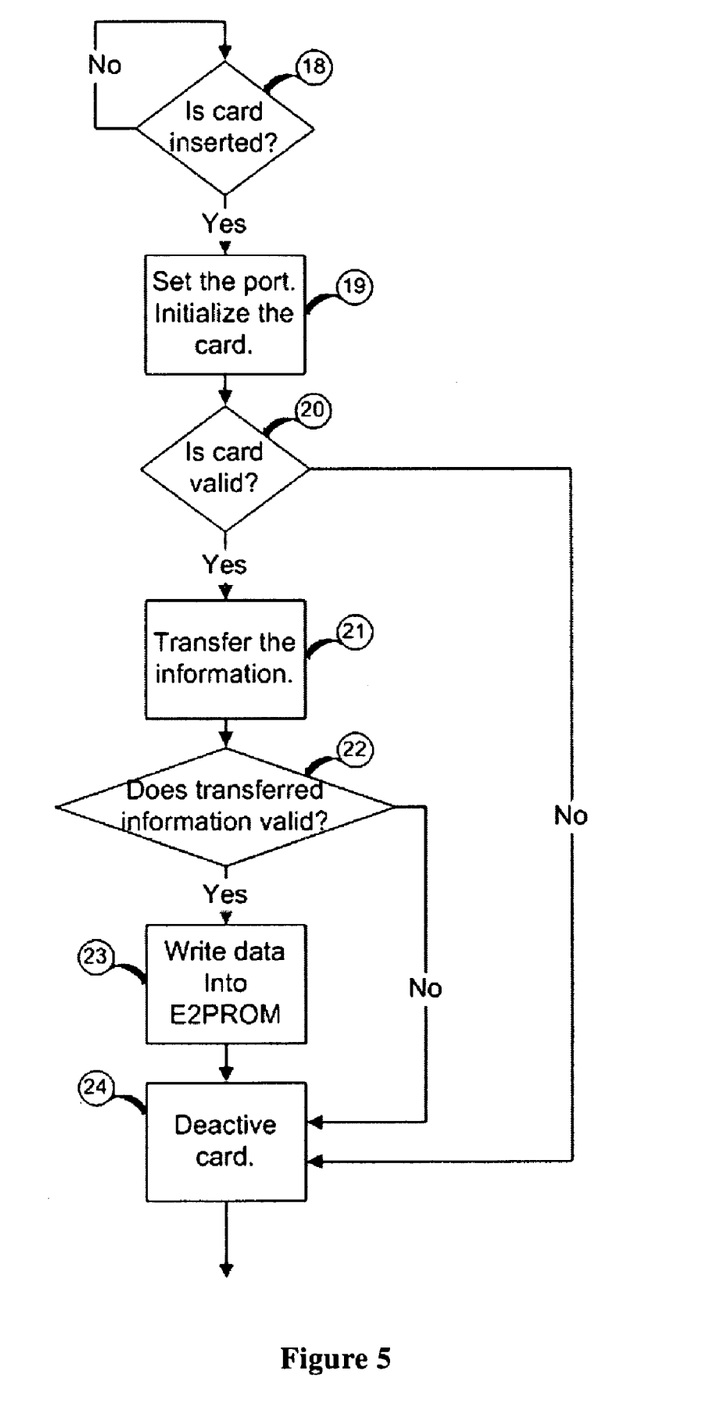
FIG. 5 is a flow chart for smartcard response routine
Figure 6:
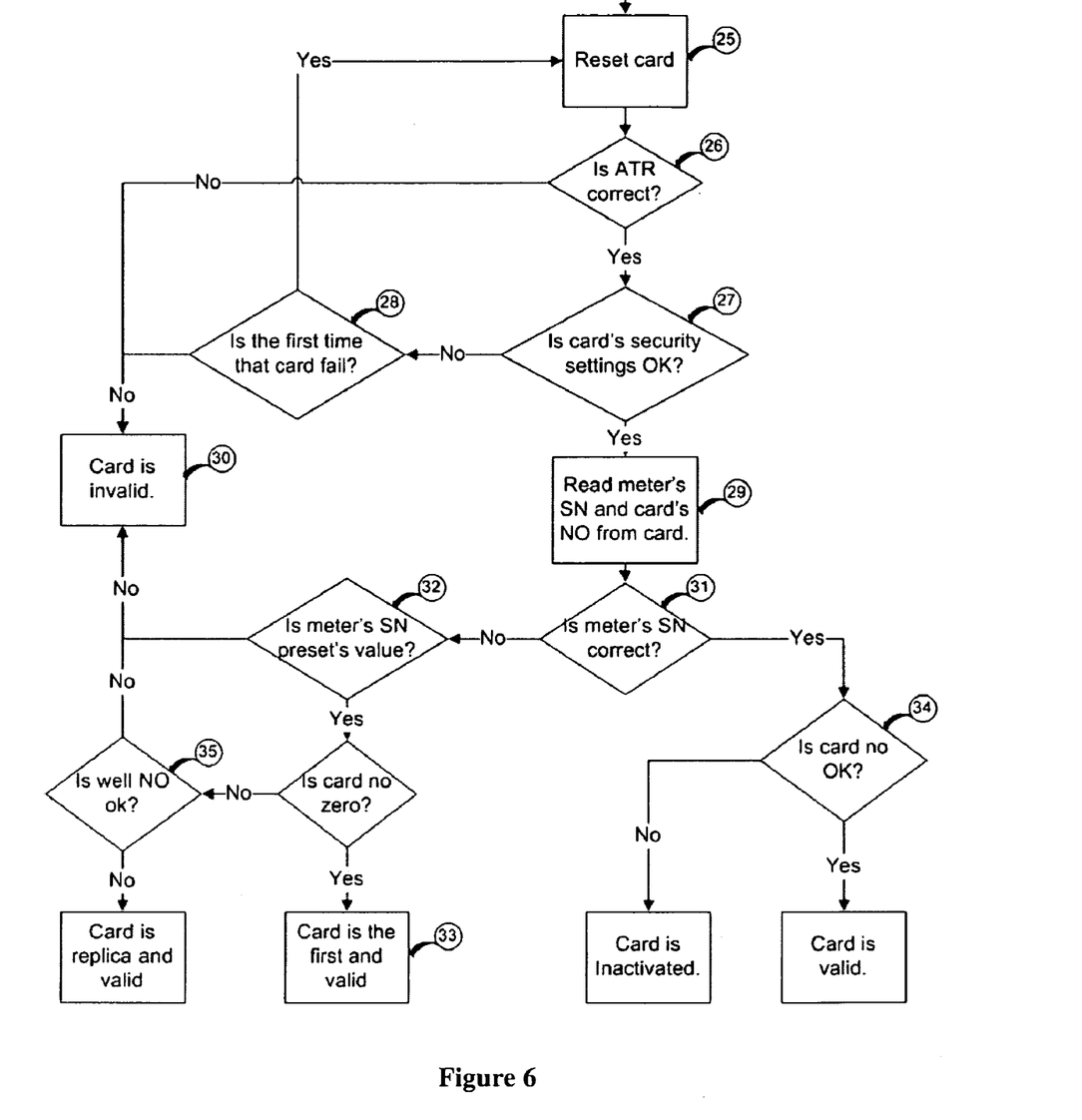
FIG. 6 is a flow chart for validation routine check of the smartcard according to the present invention

FIG. 5 is the flowchart of smartcard's response routine comprising of following sequences:
 (18) Is the first step of the smartcard's response routine, wherein the card-reader-connector continuously checks the card entrance by means of a micro-switch. If an entrance detected the routine proceeds with the next sequence, else it goes to (24)
In (19), as an entrance detected, the relevant port will be set, and the card will be initialized according to ISO 7816;

In (20) the validation routine of the card will be carried out. The flowchart of this routine is depicted in FIG. 6. If the card was valid the routine proceeds with the next sequence, else it goes to (24).

Figure 7:
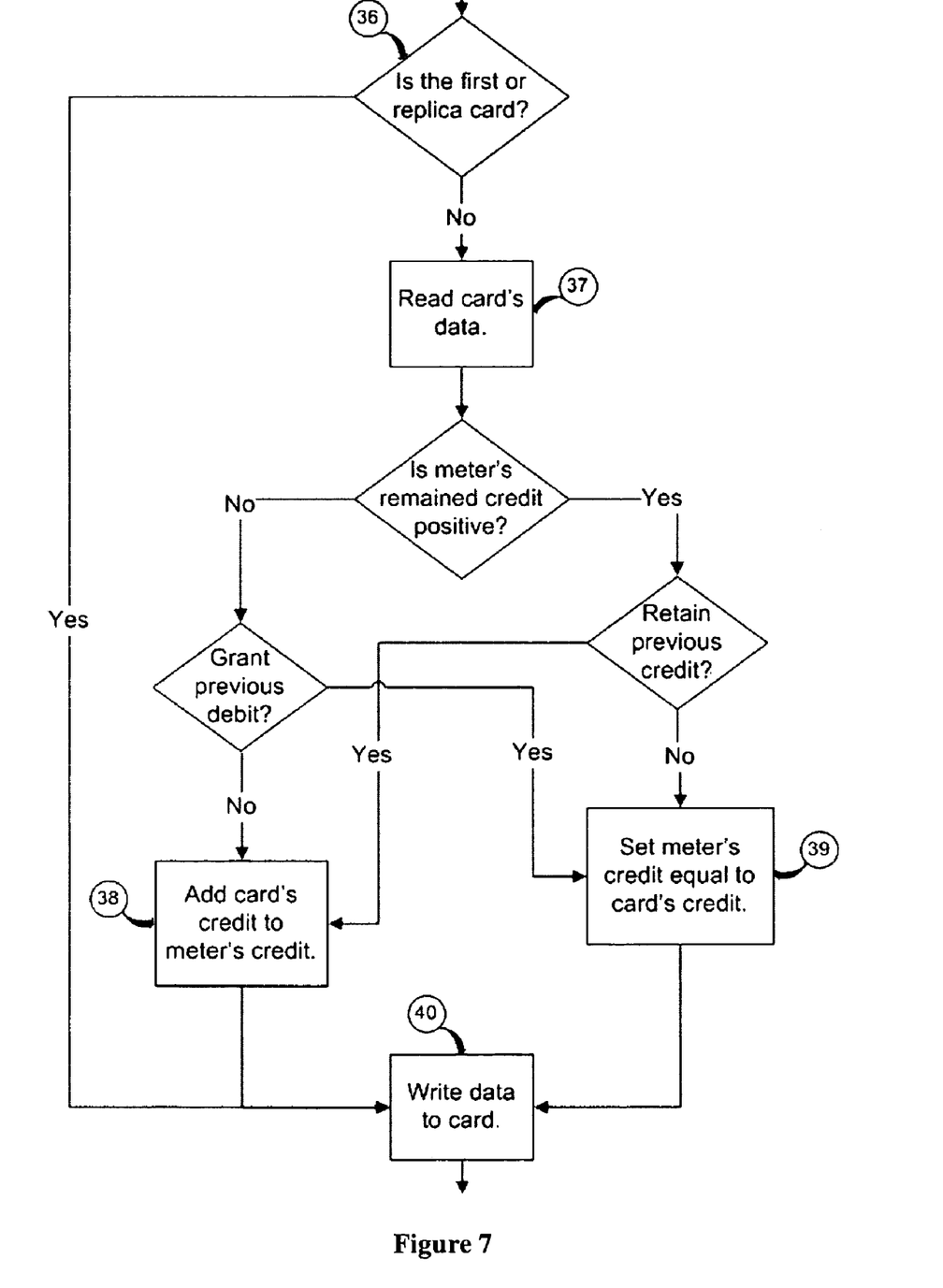
FIG. 7 is a flow chart for data transferring routine between the meter and the smartcard

In (21) the data will be transferred between the meter and the card. The algorithm of (21) is illustrated in FIG. 7;

In (22) the validation of the data-transfer will be checked and confirmed. If it was valid the routine proceeds with the next sequence, else it goes to (24)

In (23) the data of the card will be written and stored into the meter;

In (24) the card will be deactivated according to ISO 7816 standard.

The validation routine of the card is depicted in FIG. 6. It comprising of following sequences:

In (25) the card reset command is send

In (26) the card's Answer to Reset (ATR) is received and compared to the presumed ATR. If the answer was correct the routine proceeds with the next sequence, else it goes to (30).

In (27) the security settings (codes) will be exchanged and checked by meter and smartcard respectively according to one of security methods which are supported by smartcard (e.g. DES-3). If the security settings (codes) was correct the routine proceeds with (29), else it goes to (28)

(28) Checks if it is the first failure detected in (27) or not. If it was the first time the routine returns to (25), else it goes to (30)

In (29) the Serial Number (SN) of the meter and the card No. will be read from the card. (The card No. is for recognizing the replica card, if applicable)

In (30) the card is recognized and introduced as an invalid card.

(31) Checks if the meter's SN, read from the card, was correct or not. If it was correct, the card is specified as a valid card and the routine proceeds with (34), else it goes to the next sequence.

(32) Checks if the value of meter SN in card was equal to a preset SN or not. If it was equal to, then the card recognized as a new card and the routine proceeds with the next sequence, else it goes to (30).

In (33) if the value of card No. in the meter was equal to zero, the card is accepted as the first card of the meter. (no other card can be allocated to the meter after that, except for replica card with its own algorithm)

(34) Checks if the card numbers in the meter was equal to card no. in the card, then the card is valid, else the card is considered as an out-of-date card (inactivated).

In (35) if the card was new, and the other information of the card was valid too, then the card is specified as a replica card, else the card is determined as an invalid card.

The routine of data-transfer between the meter and the card is illustrated in FIG. 7 with the following sequences:

In (36) if the card was the first card or the replica, its information is not read and the routine goes to (40), else it proceeds with the next sequence.

In (37) the card's data is read.

In (38) If there was a positive residual credit in the meter, and if it was determined (in the card) to shift the remaining credit to the next credit-interval, then the residual credit is added up to the new credit (as specified in the card) and the result is stored as new interval credit in the meter.

In (39) the If there was a negative residual credit in the meter, and if it was determined (in the card) to ignore this negative-remaining-credit, then the new credit (as specified in the card) is stored as new interval credit in the meter.

In (40) the whole information (both electrical and hydraulic parameters) is transferred from meter to the card and recorded in it.

Whereas the present invention has been described with respect to a specific embodiment thereof, it will be understood that various changes and modifications will be suggested to one skilled in the art and it is intended to encompass such changes and modifications as fall within the scope of the appended claims.

We claim:

1. A method for measuring and controlling amounts of liquid and/or electrical energy consumption consumed by an electro pump by a controller, wherein said amount of liquid consumption comprises of flow and/or volume of said liquid that is pumped/transferred by said electro pump, wherein said method comprises:

continuously measuring currents and voltages of said electro-pump;

continuously calculating, and updating active and reactive energies, instant electrical power, instant power factor and the frequency of said voltages;

continuously calculating, and updating the amount of said liquid consumption by said controller wherein said Calculating and updating comprises steps of:

taking a flow-power curve of said electro-pump as a first input data;

taking an operational condition of the electro-pump as second input data wherein said second input data comprises of instant flow and instant consumed electrical power;

calibrating the Flow-Power curve according to said operational condition and obtaining a calibrated flow power curve;

obtaining the amount of flow from the calibrated flow power curve of said electro pump by locating the instant power on said calibrated flow power curve;

continuously calculating the volume of pumped/transferred liquid by taking time integral of the amount of flow;

continuously monitoring, updating, displaying and/or recording the amount of said measured currents and voltages of said electro-pump;

continuously monitoring, updating, displaying and/or recording the amount of said calculated active and reactive energies, instant electrical power, instant power factor and the frequency of said voltages;

continuously monitoring, updating displaying and/or recording the amount of said energy consumption consumed by said electro pump as an updated amount of electrical energy consumption; and continuously monitoring, updating displaying and/or recording the amount of said liquid consumption as an updated amount of liquid consumption.

2. The method as claimed in claim 1, wherein said method further comprises steps of:

controlling the amount of said liquid and/or electrical energy consumption by said controller wherein said method further comprises:

designating a predetermined allowable amount of liquid and or electrical energy consumption to a smart card which is identified with an electro pump;

communicating with said smartcard for a bilateral data transmission via a smart card reader;

checking, determining and confirming, validity of said smartcard;

reading maximum predetermined allowable amount of liquid consumption from said smart card being characterized as liquid credit;

reading maximum predetermined allowable amount of electrical energy consumption from said smart card being characterized as energy credit;

continuously updating the liquid credit by subtracting the updated liquid consumption form said liquid credit and obtaining an updated allowable amount of liquid consumption;

continuously updating the energy credit by subtracting the updated energy consumption form said energy credit and obtaining an updated allowable amount of electrical energy consumption.

3. The method as claimed in claim 1, wherein said method further comprises steps of:

recording said amount of updated liquid and/or electrical energy consumption, wherein said amount of updated liquid and/or electrical energy consumption exceeds said maximum allowable liquid and/or electrical energy consumption, and obtaining and recording an exceeded amount of maximum allowable liquid and/or electrical energy consumption.

4. The method as claimed in claim 3, wherein said method further comprises steps of: sending an optional interruption signal to disable said elector pump when said amount of updated liquid and/or electrical energy consumption exceeds said maximum allowable liquid and/or electrical energy consumption.

5. The method as claimed in claim 4, wherein said calculated, and updated active and reactive energies, said amount of updated of said liquid consumption, said updated liquid credit, said updated electrical energy credit and said exceeded amount of maximum allowable liquid and/or electrical energy consumption are stored on said smart card.

6. A system for measuring and controlling amount of liquid and/or electrical energy consumption consumed by an electro pump, wherein said amount of liquid consumption comprises of flow and/or volume of said liquid that is pumped/transferred by said electro pump, wherein said system comprises:

means for continuously measuring currents and voltages of said electro-pump;

means for continuously calculating, and updating active and reactive energies, instant electrical power, instant power factor and frequency of said voltages;

means for continuously calculating, and updating the amount of said liquid consumption wherein said calculating and updating comprises steps of:

means for taking a flow-power curve of said electro-pump as a first input data;

means for taking an operational condition of the electro-pump as second input data wherein said second input data comprises of instant flow and instant consumed electrical power;

means for calibrating the Flow-Power curve according to said operational condition and obtaining a calibrated flow power curve;

means for obtaining the amount of flow from the calibrated flow power curve of said electro pump by locating the instant power on said calibrated flow power curve;

means for continuously calculating the volume of pumped/transferred liquid by taking time integral of the amount of flow;

means for continuously monitoring, updating, displaying and/or recording the amount of said measured currents and voltages of said electro-pump;

means for continuously monitoring, updating, displaying and/or recording the amount of said calculated active and reactive energies, instant electrical power, instant power factor and the frequency of said voltages;

means for continuously monitoring, updating displaying and/or recording the amount of said energy consumption consumed by said electro pump as an updated amount of electrical energy consumption; and means for continuously monitoring, updating displaying and/or recording the amount of said liquid consumption as an updated amount of liquid consumption.

7. The system as claimed in claim 6, wherein said system further comprises:

means for controlling the amount of said liquid and/or electrical energy consumption wherein said method further comprises;

means for designating a predetermined allowable amount of liquid and or electrical energy consumption to a smart card which is identified with an electro pump;

means for Communicating with said smartcard for a bilateral data transmission via a smart card reader;

means for checking, determining and confirming validity of said smartcard;

means for Reading maximum predetermined allowable amount of liquid consumption from said smart card being characterized as liquid credit;

means for Reading maximum predetermined allowable amount of electrical energy consumption from said smart card being characterized as energy credit;

means for continuously updating the liquid credit by subtracting the updated liquid consumption form said liquid credit and obtaining an updated allowable amount of liquid consumption;

means for continuously updating the energy credit by subtracting the updated energy consumption form said energy credit and obtaining an updated allowable amount of electrical energy consumption.

8. The system as claimed in claim 6, wherein said system further comprises:

means for Recording said amount of updated liquid and/or electrical energy consumption, wherein said amount of updated liquid and/or electrical energy consumption exceeds said maximum allowable liquid and/or electrical energy consumption, and means for obtaining and recording an exceeded amount of maximum allowable liquid and/or electrical energy consumption.

9. The system as claimed in claim 8, wherein said system further comprises:

means for sending an optional interruption signal to disable said elector pump when said amount of updated liquid and/or electrical energy consumption exceeds said maximum allowable liquid and/or electrical energy consumption.

10. The system as claimed in claim 9, wherein said system further comprises:

means for storing said calculated, and updated active and reactive energies, said amount of updated of said liquid consumption, said updated liquid credit, said updated electrical energy credit and said exceeded amount of maximum allowable liquid and/or electrical energy consumption on said smart card.

* * * * *